United States Patent [19]

Grose

[11] Patent Number: 5,325,706

[45] Date of Patent: Jul. 5, 1994

[54] DISPENSER LEAK DETECTION

[75] Inventor: John S. Grose, Kernersville, N.C.

[73] Assignee: Gilbarco, Inc., Greensboro, N.C.

[21] Appl. No.: 917,762

[22] Filed: Jul. 21, 1992

[51] Int. Cl.⁵ ............................................. G01M 3/28
[52] U.S. Cl. ...................................... 73/40.5 R; 222/52;
340/605
[58] Field of Search ....................... 73/40.5 R; 222/52;
340/605

[56] References Cited

U.S. PATENT DOCUMENTS

| 3,454,195 | 7/1969 | Deters | 222/52 |
|---|---|---|---|
| 3,817,087 | 6/1974 | Mooney | 73/40.5 |
| 3,910,102 | 10/1975 | McLean | 73/40.5 |
| 3,940,020 | 2/1976 | McCrory | 222/52 |
| 4,088,987 | 5/1978 | Resler et al. | 73/40.5 R X |
| 4,114,426 | 9/1978 | McLean | 73/40.5 |
| 4,131,216 | 12/1978 | Gerstenmaier et al. | 222/52 |
| 4,404,842 | 9/1983 | Mooney | 73/40.5 |
| 4,553,212 | 11/1985 | Hayashi | 364/507 |
| 4,658,986 | 4/1987 | Freed et al. | 222/52 |
| 5,042,240 | 8/1991 | Geisinger | 73/40.5 |
| 5,072,621 | 12/1991 | Hasselmann | 73/40.5 R |

FOREIGN PATENT DOCUMENTS 0351061 6/1989 European Pat. Off. .

Primary Examiner—Hezrone E. Williams
Assistant Examiner—Joseph W. Roskos
Attorney, Agent, or Firm—Rhodes Coats & Bennett

[57] ABSTRACT

A fuel dispensing apparatus includes a fuel reservoir having a pump to pump fuel from the reservoir into a first leg of piping. A master dispenser downstream of the first leg of piping has an outlet hose, a user-controllable switch activatable to turn on the pump to pump motor fuel from the reservoir to the master dispenser, a meter to detect the flow of motor fuel being dispensed through the master dispenser, and a second leg of piping downstream of the meter and exiting the master dispenser. A satellite dispenser is connected to second leg. An electronic means simulates the activation of the switch by turning on the pump and determines the meter's detection of the flow of motor fuel during a time of simulated activation of the switch and outputs a leak detection signal when such flow is detected.

25 Claims, 1 Drawing Sheet

DISPENSER LEAK DETECTION

BACKGROUND OF THE INVENTION

The present invention relates to improvements in motor fuel dispensers, particularly of the master/satellite configuration to determine if leaks exist in connections between the master and satellite dispensers.

Master and satellite fuel dispenser configurations have been known for a number of years and are particularly prevalent for use in fueling large trucks which have gas tanks on both sides of the vehicle. These types of installations are common in truck stops. In the installation, the master and satellite are located on opposed sides of a driveway onto which the vehicle to be fueled is driven. The driver removes the hose from the master dispenser and actuates a switch on the master dispenser, commonly a handle lever that supports the nozzle when it is idle. He or she can then dispense gasoline through the nozzle into the tank located on the side of the truck adjacent the master dispenser. Then, by leaving the hose and nozzle of the master dispenser in the fuel tank, he can walk around to the other side of the truck and fuel the tank on that side of the truck from the satellite dispenser. Again, he or she lifts the nozzle from the handle on the satellite dispenser and fuels the tank from that side. Upon returning the satellite dispenser hose to the satellite dispenser handle and returning the master dispenser hose to the master dispenser handle, it is ascertained that the dispensing of fuel is complete and the total amount due can be computed.

Typically, the fuel to the master dispenser comes from an underground storage tank having a submerged turbine pump, which is activated when fuel is to be pumped. In a known configuration, the lifting of the pump handle on the master dispenser sends a signal to a processing unit in the master dispenser. The processing unit zeros out the last transaction information in the dispenser and actuates the submerged pump. A solenoid valve located downstream of the meter in the dispenser is held shut for a period of three to five seconds to permit pressure in the pipe from the submerged pump to the solenoid valve to build up. Known mechanical devices along the line from the underground tank to the master dispenser determine if a leak exists between the underground tank and the solenoid valve of the master dispenser. After the three to five second period for the leak test, the solenoid valve in the master dispenser is opened to permit dispensing of fuel from the master dispenser. The leak test performed conventionally only ascertains if a leak exists between the underground tank and the master dispenser.

However, should a leak exist between the meter of the master dispenser and the solenoid valve of the satellite dispenser, there is no way of ascertaining same until detected by a bubbling up of fuel through the roadway or some other undesirable means. Accordingly, there exists a need in the art for a method and apparatus for ascertaining the presence of a leak condition between a master and satellite dispenser.

SUMMARY OF THE INVENTION

The present invention fulfills this need in the art by providing a fuel dispensing apparatus that includes a fuel reservoir having a pump to pump fuel from the reservoir into a first leg of piping. A master dispenser downstream of the first leg of piping has an outlet hose, a user-controllable switch activatable to turn on the pump to pump motor fuel from the reservoir to the master dispenser, a meter to detect the flow of motor fuel being dispensed through the master dispenser, and a second leg of piping downstream of the meter and exiting the master dispenser. A satellite dispenser is connected to the second leg. Electronic means is provided for simulating the activation of the switch by turning on the pump and for determining the meter's detection of the flow of motor fuel during a time of simulated activation of the switch and for outputting a leak detection signal when such flow is detected.

Preferably, the electronic means automatically simulates activation of the switch on a periodic basis. Also desirable is for the electronic means to include means for monitoring actual activation of the switch and terminating the simulation upon detection of actual switch activation.

If the master dispenser includes an electronic display device, when the electronic means outputs a leak detection signal it may display an error message on the display device. Alternatively or conjointly, it may disable use of the master and satellite dispensers. If the master dispenser includes an audible message device, the electronic means may sound an audible alarm on the audible message device. If the master dispenser is connected to a site controller, the electronic means may communicate the signal to the site controller.

Typically, the satellite dispenser includes a valve downstream of the second leg and an outlet hose downstream of the valve, and the valve is maintained closed during simulated activation of the switch.

The invention also provides a method of detecting leaks in piping connecting master and satellite motor fuel dispensers in which the master dispenser includes a switch activatable to turn on a pump to pump motor fuel from a reservoir to the master dispenser, a meter to detect the flow of motor fuel being dispensed, and piping to the satellite dispenser downstream of the meter. The method proceeds by simulating activation of the switch, determining the meter's detection of the flow of motor fuel during a time of simulated activation of the switch, and signalling a leak when such flow is detected.

Preferably, activation of the switch is simulated on a periodic basis. The method may include monitoring actual activation of the switch and terminating simulation upon detection of actual switch activation.

The signalling step may take the form of signalling the leak on a visual display or audibly or electronically to a site controller. Also the method may include disabling use of the master and satellite dispensers when a leak is detected.

BRIEF DESCRIPTION OF THE DRAWINGS

The invention will be better understood by a review of the detailed description of the preferred embodiment along with a study of the drawing, which is a schematic diagram of the components of an embodiment of the master and satellite leak detection system.

DETAILED DESCRIPTION OF THE PREFERRED EMBODIMENT

Figure 1:
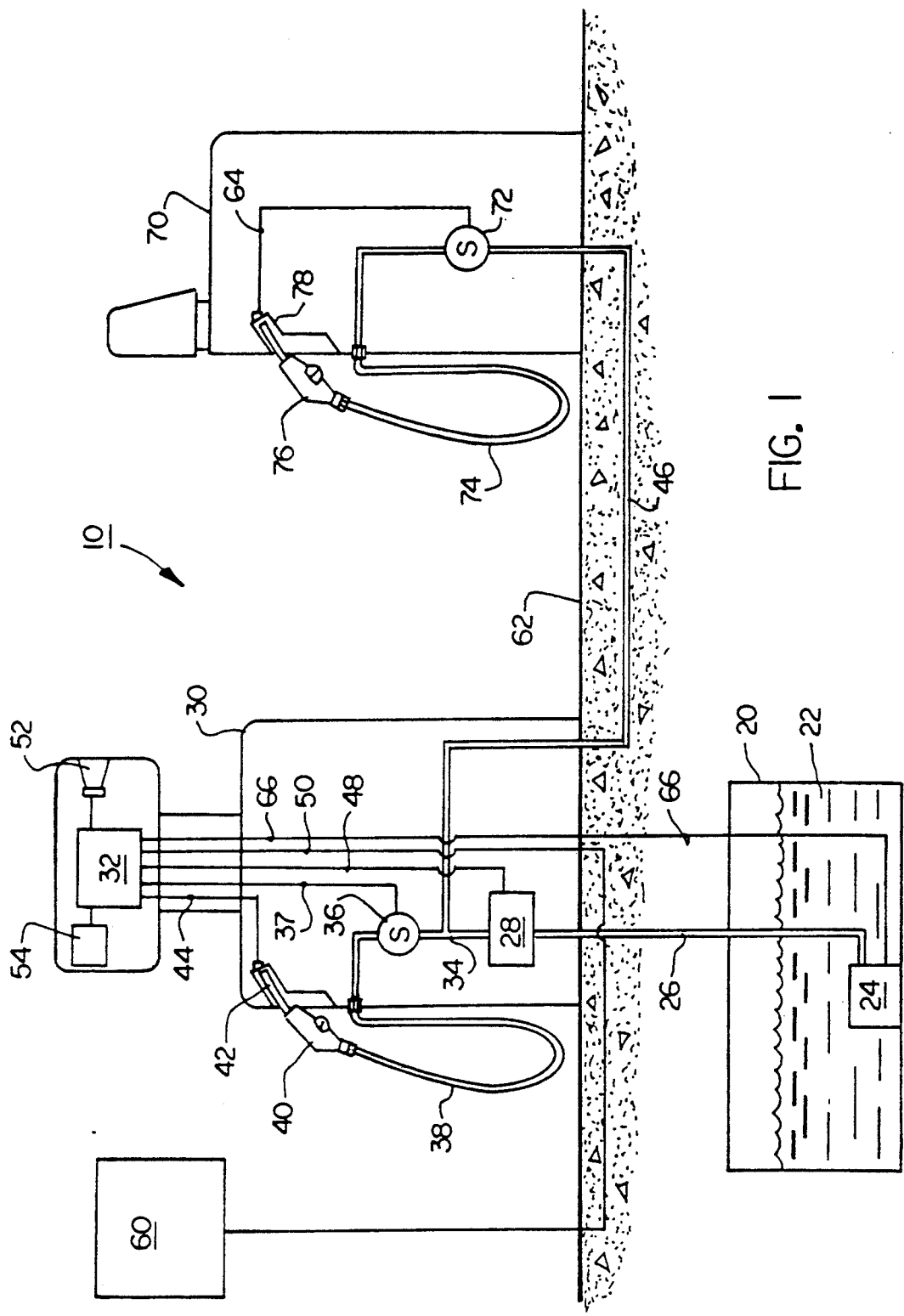

Referring to the Figure, the apparatus according to a preferred embodiment of the invention includes an underground storage tank 20 capable of holding a motor fuel 22, such as gasoline, diesel fuel, or the like. A submerged turbine pump 24 is adapted to draw the fuel 22 from the tank 20 and direct it outwardly along primary piping 26 to a master dispenser 30. Within the master dispenser 30, a meter 28 is provided downstream of the piping 26. The meter 28 is a conventional meter, such as the meter and pulser combination sold by Gilbarco, Inc. of Greensboro, N.C. or any other desired fluid flow meter. Data concerning the flow rate dispensed by the meter 28 is output on a line 48 to a central processing unit 32 housed within the master dispenser 30. Fuel exiting the meter 28 passes out through a pipe tee 34 so that it is available to a solenoid valve 36 and also to secondary piping 46. The solenoid valve 36 is normally closed, but is openable upon receipt of an opening signal along line 37 from the cpu 32. When the valve 36 is open, the pressurized fuel is available in hose 38 which terminates in a conventional fuel dispensing nozzle 40. Also as is conventional, the fuel dispensing nozzle 40 is stored in a nozzle handle 42.

The customer dispenses fuel from the master dispenser 30 by removing the nozzle 40 from the handle 42 and lifting the handle 42. This lifting action is sensed by a switch which passes a signal along line 44 to the central processing unit 32.

Central processing unit 32 may be operatively associated with a visual display 54 such as a cathode ray tube, liquid crystal displays or the like. The cpu 32 may also be operatively associated to an audible display 52.

The second leg of piping 46 which passes from the pipe tee 34 exits the master dispenser 30 and extends under grade 62 to satellite dispenser 70. As can be appreciated, the grade 62 may very well be a driveway over which heavy vehicles pass, so that the secondary piping 46 may periodically be subjected to severe physical stresses and strain. In the event that such stresses and strains or ordinary corrosion and the like result in a leak in the secondary piping 46, it is desirable to ascertain same as quickly as possible. The secondary piping 46 enters the secondary dispenser 70 and its flow is interruptable by a solenoid control valve 72. Downstream of the solenoid control valve 72 is a conventional hose 74, nozzle 76, and handle 78 completely analogous to the hose, nozzle and handle 38,40,42 of the master dispenser. The hose handle 78 is provided such that, when it is lifted, a signal passes along line 64 to the solenoid valve 72 to open that valve.

The cpu 32 is programmed or otherwise arranged to go into a leak detection mode, preferably at a time of day of little or no expected actual dispenser use. In doing so, the cpu outputs a signal along line 66 to turn on pump 24, and monitors line 48 to determine if meter 28 signals the flow of any liquid. Solenoid valves 36,72 are maintained closed during this period. While in the leak detection mode, cpu 32 also monitors lines 44,64. If either returns a signal that a pump handle has been lifted, the leak detection test is aborted, so that normal use of the pump dispensers may proceed. If a leak is observed, the cpu may be programmed to prevent use of the dispensers.

The master and satellite dispensers may be one of a multiplicity of dispensers located at a particular fuel dispensing facility such as a truck stop. If so, a master site controller 60 may be provided to supervise the operations of the various master and satellite dispensers. If this is desired, a line 50 from the cpu 32 to the site controller 60 is included to pass data concerning leak conditions detected by the apparatus.

In normal operation of the master and satellite dispensers for fuel dispensing, the truck driver parks his or her vehicle adjacent the master dispenser 30, removes the nozzle 40 from the handle 42 and raises the handle 42, which passes a signal along line 44 to the cpu 32. The cpu 32 in turn passes a signal along line 66 to the pump 24 to begin pumping fuel 22 through line 26. Conventional detectors are provided along primary line 26 to determine if a leak exists along line 26, and a three to five second delay is provided after the actuation of line 66 during which such physical leak detectors sense any possible leaks. If no leak is sensed, the cpu 32 passes a signal along line 37 to open the solenoid valve 36 to permit dispensing of fuel through the hose 38 and nozzle 40, with a valve in the nozzle 40 under the control of the operator.

When that side of the truck has been fueled, the nozzle 40 is left in the fuel tank and the nozzle 76 is removed from the handle 78 of the satellite dispenser 70. Raising of the handle 78 passes the signal along line 64 to open the solenoid valve 72 to permit the dispensing from the satellite dispenser into a tank on the other side of the truck. Since the handle 78 only sends a signal to open the valve 72, the dollar amount of the sale recorded by the cpu 32 is not zeroed out by the raising of the handle 78. And since the fuel passing to the satellite dispenser passes through the meter 28, the total sale is recorded on the master dispenser. Thus, the fueling of both tanks on both sides of the truck through the master and satellite dispensers are both reflected by the one transaction computed by the cpu 32.

Operation of the apparatus in a leak detection mode is quite straight forward. At some time when both the master and satellite dispensers are idle, such as in the early hours of the morning, the cpu 32 will simulate the action caused by the lifting of handle 42 by generating a signal along line 66 to actuate the submerged pump 24 while maintaining both of the solenoid valves 36,72 closed. Thus, the pump 24 will pressurize the lines 26,46, but if no leak exists, no actual fluid will pass through the meter 28. However, in the event that there is a leak along line 46, or a leak in the solenoid valve 72, the meter 28 will detect some fluid motion and provide a signal along line 48 to the central processing unit 32. Since the central processing unit is operating in the test mode, the receipt of that signal along line 48 will be interpreted as indicative of a leak condition. This leak condition may in turn be signaled on the visual display 54, or audibly through horn 52. Furthermore, the cpu, being in control of the master and satellite dispensers, may disable them until the leak is repaired, to minimize any loss of product, environmental damage and fire hazard. Finally, if desired, the cpu 32 may pass a signal along line 50 to the site controller 60 indicating that the leak condition has been detected so that an operator at the site controller 60 may take appropriate remedial action.

Those of ordinary skill in the art will readily know how to program or configure the cpu 32 to operate in the fashion described herein.

As can be appreciated, the apparatus according to the invention and the method according to the invention can take various forms departing from that specifically described herein, and those variations and modifications are deemed to be within the scope of the invention as claimed herein.

What is claimed is:

1. An apparatus for detecting leaks in piping connecting master and satellite motor fuel dispensers in which the master dispenser includes:

a. a switch activatable to turn on a pump to pump motor fuel from a reservoir to the master dispenser, b. a meter to detect the flow of motor fuel being dispensed, and c. piping to the satellite dispenser downstream of the meter, said apparatus comprising electronic means for simulating the activation of the switch and for determining the meter's detection of the flow of motor fuel during a time of simulated activation of the switch and for outputting a leak detection signal when such flow is detected.

2. An apparatus as claimed in claim 1 wherein said electronic means automatically simulates activation of the switch on a periodic basis.

3. An apparatus as claimed in claim 1 wherein said electronic means includes means for detecting actual activation of the switch and terminates simulation upon detection of actual switch activation.

4. An apparatus as claimed in claim 1 wherein the master dispenser includes an electronic display device and when said electronic means outputs a leak detection signal it displays an error message on the display device.

5. An apparatus as claimed in claim 1 wherein when said electronic means outputs a leak detection signal it disables use of the master and satellite dispensers.

6. An apparatus as claimed in claim 1 wherein the master dispenser includes an audible message device and when said electronic means outputs a leak detection signal it sounds an audible alarm on the audible message device.

7. An apparatus as claimed in claim 1 wherein the master dispenser is connected to a site controller and when said electronic means outputs a leak detection signal it communicates the signal to the site controller.

8. A fuel dispensing apparatus comprising:

a fuel reservoir having a pump to pump fuel from the reservoir into a first leg of piping, a master dispenser downstream of said first leg of piping and having an outlet hose, a user-controllable switch activatable to turn on said pump to pump motor fuel from said reservoir to said master dispenser, a meter to detect the flow of motor fuel being dispensed through said master dispenser, a second leg of piping downstream of said meter and exiting the master dispenser, a satellite dispenser connected to said second leg, and electronic means for simulating the activation of said switch by turning on said pump and for determining said meter's detection of the flow of motor fuel during a time of simulated activation of said switch and for outputting a leak detection signal when such flow is detected.

9. An apparatus as claimed in claim 8 wherein said electronic means automatically simulates activation of the switch on a periodic basis.

10. An apparatus as claimed in claim 8 wherein said electronic means includes means for monitoring actual activation of the switch and terminates simulation upon detection of actual switch activation.

11. An apparatus as claimed in claim 8 wherein the master dispenser includes an electronic display device and when said electronic means outputs a leak detection signal it displays an error message on said display device.

12. An apparatus as claimed in claim 8 wherein when said electronic means outputs a leak detection signal it disables use of said master and satellite dispensers.

13. An apparatus as claimed in claim 8 wherein said master dispenser includes an electronic audible message device and when said electronic means outputs a leak detection signal it sounds an audible alarm on said audible message device.

14. An apparatus as claimed in claim 8 wherein said master dispenser is connected to a site controller and when said electronic means outputs a leak detection signal it communicates the signal to said site controller.

15. An apparatus as claimed in claim 8 wherein said satellite dispenser includes a valve downstream of said second leg and an outlet hose downstream of said valve and said valve is maintained closed during simulated activation of said switch.

16. A method of detecting leaks in piping connecting master and satellite motor fuel dispensers in which the master dispenser includes a switch activatable to turn on a pump to pump motor fuel from a reservoir to the master dispenser, a meter to detect the flow of motor fuel being dispensed, and piping to the satellite dispenser downstream of the meter, comprising simulating the activation of the switch, determining the meter's detection of the flow of motor fuel during a time of simulated activation of the switch, and signalling a leak when such flow is detected.

17. A method as claimed in claim 16 comprising simulating activation of the switch on a periodic basis.

18. A method as claimed in claim 16 further comprising monitoring actual activation of the switch and terminating simulation upon detection of actual switch activation.

19. A method as claimed in claim 16 wherein the signalling step comprises signalling the leak on a visual display.

20. A method as claimed in claim 16 further comprises disabling use of the master and satellite dispensers when a leak is detected.

21. A method as claimed in claim 16 wherein the signalling step comprises signalling the leak audibly.

22. A method as claimed in claim 16 wherein the signalling step comprises signalling the leak to a site controller.

23. A method as claimed in claim 16 in which the satellite dispenser includes a valve downstream of the piping and an outlet hose downstream of the valve further comprising the step of maintaining the valve closed during simulated activation of the switch.

24. A fuel dispensing apparatus comprising:

a fuel reservoir having a pump to pump fuel from the reservoir into a first leg of piping, a master dispenser downstream of said first leg of piping and having an outlet hose, a user-controllable switch activatable to turn on said pump to pump motor fuel from said reservoir to said master dispenser, a meter to detect the flow of motor fuel being dispensed through said master dispenser, a second leg of piping downstream of said meter and exiting the master dispenser, a satellite dispenser connected to said second leg and including a valve downstream of said second leg and an outlet hose downstream of said valve, and electronic means for a) periodically stimulating the activation of said switch by turning on said pump while maintaining said valve in said satellite dispenser closed and for determining said meter's detection on the flow of motor fuel during a time of simulated activation of said switch and for outputting a leak detection signal when such flow is detected, and b) detecting actual activation of the switch and terminates simulation upon detection of actual switch activation.

25. A method of detecting leaks in piping connecting master and satellite motor fuel dispensers in which the master dispenser includes a switch activatable to turn on a pump to pump motor fuel form a reservoir to the master dispenser, a meter to detect the flow of motor fuel being dispensed, and piping to the satellite dispenser downstream of the meter with a valve downstream of the piping in the satellite dispenser and an outlet hose downstream of the valve, comprising periodically simulating the activation of the switch while maintaining the valve closed, determining the meter's detection of the flow of motor fuel during a time of simulated activation of the switch, signalling a leak when such flow is detected, and monitoring actual activation of the switch and terminating simulation upon detection of actual switch activation.

* * * * *